United States Patent
Doganata et al.

(10) Patent No.: US 6,798,753 B1
(45) Date of Patent: Sep. 28, 2004

(54) AUTOMATICALLY ESTABLISHING CONFERENCES FROM DESKTOP APPLICATIONS OVER THE INTERNET

(75) Inventors: Yurdaer Doganata, Chestnut Ridge, NY (US); Asser Nasreldin Tantawi, Somers, NY (US); Howard L. Operowsky, Poughkeepsie, NY (US); Magda M. Mourad, Yorktown Heights, NY (US); A. Steven Krantz, Coral Springs, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/417,632

(22) Filed: Oct. 14, 1999

(51) Int. Cl.[7] .............................................. H04L 12/16
(52) U.S. Cl. .................... 370/260; 379/158; 379/202.01
(58) Field of Search ................................ 370/260–263, 370/271; 379/157, 158, 202.01, 205.01, 207.03; 709/204–207

(56) References Cited

U.S. PATENT DOCUMENTS

| | | | | |
|---|---|---|---|---|
| 5,138,655 A | * | 8/1992 | Takashima et al. | 379/157 |
| 5,642,156 A | * | 6/1997 | Saiki | 348/14.09 |
| 5,764,278 A | * | 6/1998 | Nagao | 348/14.1 |
| 5,812,653 A | * | 9/1998 | Jodoin et al. | 379/205.01 |
| 6,185,194 B1 | * | 2/2001 | Musk et al. | 370/260 |
| 6,256,389 B1 | * | 7/2001 | Dalrymple et al. | 370/352 |
| 6,385,644 B1 | * | 5/2002 | Devine et al. | 709/206 |
| 6,411,605 B1 | * | 6/2002 | Vance et al. | 370/261 |
| 2002/0031096 A1 | * | 3/2002 | Johnson, Jr. et al. | 370/260 |

* cited by examiner

Primary Examiner—Chi Pham
Assistant Examiner—Andrew M Waxman
(74) Attorney, Agent, or Firm—Douglas W. Cameron; Anne V. Dougherty

(57) ABSTRACT

A system and method for providing automatic scheduling and establishment of telephone conferences over a network such as the Internet. A user inputs conference information to a desktop application, and the scheduling, the contacting of participants, and the control of the conference are conducted automatically. If the conference is scheduled to dial out to the participants and is marked as a calendar entry, the desktop application stores the conference information, including the start/end time of a conference, the telephone numbers of the participants, the choice of service provider, and an account id. Once a teleconference calendar entry is created, the process starts and the conference is established automatically. At the scheduled time, the desktop application warns the user by running an alarm function to remind them of the time of the conference. Thereafter, a secondary application is invoked and the conference information is passed to the secondary application for automatic establishment of the conference. When the secondary application is invoked, it establishes an Internet connection with the service provider and exchanges data messages to start and monitor the audio conference. The status of the participants and of the conference are reported to the user by the secondary application via a user interface. The conference service provider receives the telephone numbers of the participants over the established data connection and starts dialing out to the participants. When the participants answer, they are all connected to an audio bridge. In one modification of the invention, the service provider returns a dial-in number and a password, upon request, to be distributed to the participants, so that any users who are unable to provide a dial-out number in advance may dial in to the scheduled conference.

26 Claims, 6 Drawing Sheets

Figure 1:
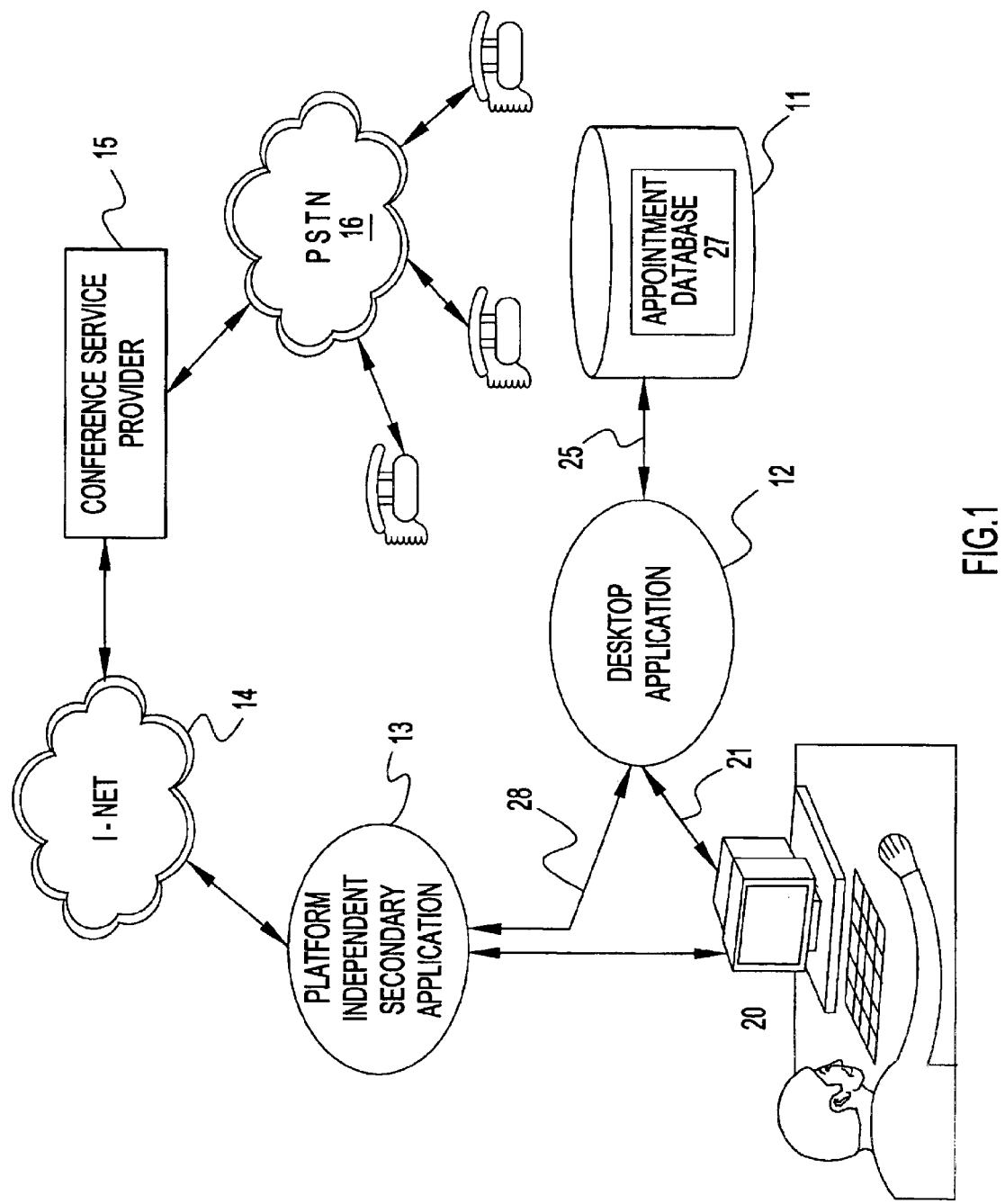

AUTOMATICALLY ESTABLISHING CONFERENCES FROM DESKTOP APPLICATIONS OVER THE INTERNET

FIELD OF THE INVENTION

The invention relates generally to the field of communications, and more particularly to a method for automatically establishing a conference over the Internet from a desktop application.

BACKGROUND OF THE INVENTION

Although the telephone industry is heavily computerized, the procedure for establishing and joining conference calls is still very much a manual one. Conference calls are reserved by calling a human operator who receives the information, types the information into a computer, confirms the reservation, and then provides the caller with a call-in number and a password for use when joining the conference. Similarly, when joining the conference, each participant again calls a human operator. The operator asks each participant for the conference password and validates it, sometimes obtains information about the caller, and ultimately connects the participant into the conference call. Some telephone companies are beginning to allow users to make their own reservations via the Internet, although participants must still go through a human operator in order to join a conference. MCI, for example, allows users to make requests for conference reservations via the Internet with its networkMCI Conferencing Net Scheduler product. Nonetheless, the MCI system still depends on personnel to read the requests, make the reservations, and send confirmations to the customers. There also exist some Internet applications for starting teleconferences from a browser, such as the SPRINT Internet Conference Center. The Sprint system allows users to set up and manage conference calls from a browser, whereby the users log in to the Sprint conference web site and enter the telephone numbers of the participants with whom that they would like a conference, and the conference begins almost immediately.

Other conferencing applications include one which provides control of the conferencing bridge from a PC desktop using software developed to interface with a particular audio bridge. Most audio bridge producers provide bridge control software to their customers as well. Multilink, Latitute and Dialogic are three companies that currently produce audio bridges with audio bridge control software which enables a user to reserve/start audio conferences from a friendly user interface.

Today, almost every computer user has a desktop organizer which consists of a calendar utility and a personal address book. The calendar utility helps to manage personal appointments and schedules. The personal address book, on the other hand, is a small database that is used to keep telephone numbers, names, addresses, etc. For teleconference scheduling, generally, users check their calendars for availability, look up the telephone numbers of their friends or colleagues from their personal address books, and then call the teleconference service provider to set up a conference.

What is desired, and is an object of the present invention, is to provide a method for automating the teleconference set up process from an existing office desktop application.

It is another object of the invention to provide a system and method for automating the teleconferencing process by connecting desktop office applications, such as calendar and address book, to the audio bridge of the teleconference service provider.

It is still another object of this invention to provide such a system and method by which users will be able to automatically schedule conferences and mark them on their desktop calendars using the information in their personal address books.

Yet another object of the invention is to enable calendar applications to start teleconferences automatically at the scheduled conference time without any operator intervention.

It is a further object of the invention to provide a method for collecting conference set up information from the user and/or automatically from the existing desktop office applications, such as calendar and personal address book, with the user only providing the date and time for the conference. Other information to be collected would optionally be determined by the specific conference server employed and may include: names and addresses of invitees, conference duration, and the account to be charged.

Another object of the invention is to provide a method to invoke a platform independent secondary application to schedule or to start a teleconference, to pass the conference information to the secondary application which establishes a connection with the teleconference service provider over the Internet, to send requests to schedule, start, or end a conference, to dial or hangup with participants, to add to or drop from a conference; to get conference status, and to get party status, with the teleconference service provider responding by sending back a dial-in number, passcode, the conference status, and acknowledgments.

It is also an object to provide the aforementioned secondary platform independent application as an application which is portable to other platforms, which coexists with office application, and which is capable of establishing and exchanging data with the conference service provider over the Internet.

SUMMARY OF THE INVENTION

These and other objects are realized by the present invention wherein a desktop application is invoked directly by the user and allows the user to provide the information necessary for establishing the conference. The desktop application can obtain the necessary information in a variety of ways including, at the simplest level, having the user invoke it at the command line and specify the input as arguments. In a more user-friendly implementation, the application displays a form with fields for user input of the necessary information.

If the conference is scheduled to dial-out the participants and is marked as a calendar entry, the desktop application stores the conference information in a database. A record in this database includes the start/end time of a conference, the telephone numbers of the participants, the choice of service provider, and, if appropriate, an account id. Once a teleconference calendar entry is created, the process for establishing the conference starts and proceeds automatically. At the scheduled time, the desktop application optionally warns the user by running an alarm function to remind them of the time of the conference. Thereafter, a secondary application is invoked, either manually or automatically, and the conference information is passed to the secondary application for automatic establishment of the conference. When the secondary application is invoked, it establishes an Internet connection with the service provider and exchanges data messages to start and monitor the audio conference. The status of the participants and the status of the conference are reported to the user by the secondary application via a user interface. The conference service provider receives the telephone numbers of the participants over the established data connection and starts dialing out to the participants. When the participants answer, they are all connected to the audio bridge in order to establish an audio conference. In one modification of the invention, the service provider returns a dial-in number and a password, upon request, to be distributed to the participants, so that any users who are unable to provide a dial-out number in advance may dial in to the scheduled conference.

BRIEF DESCRIPTION OF THE INVENTION

Figure 2:
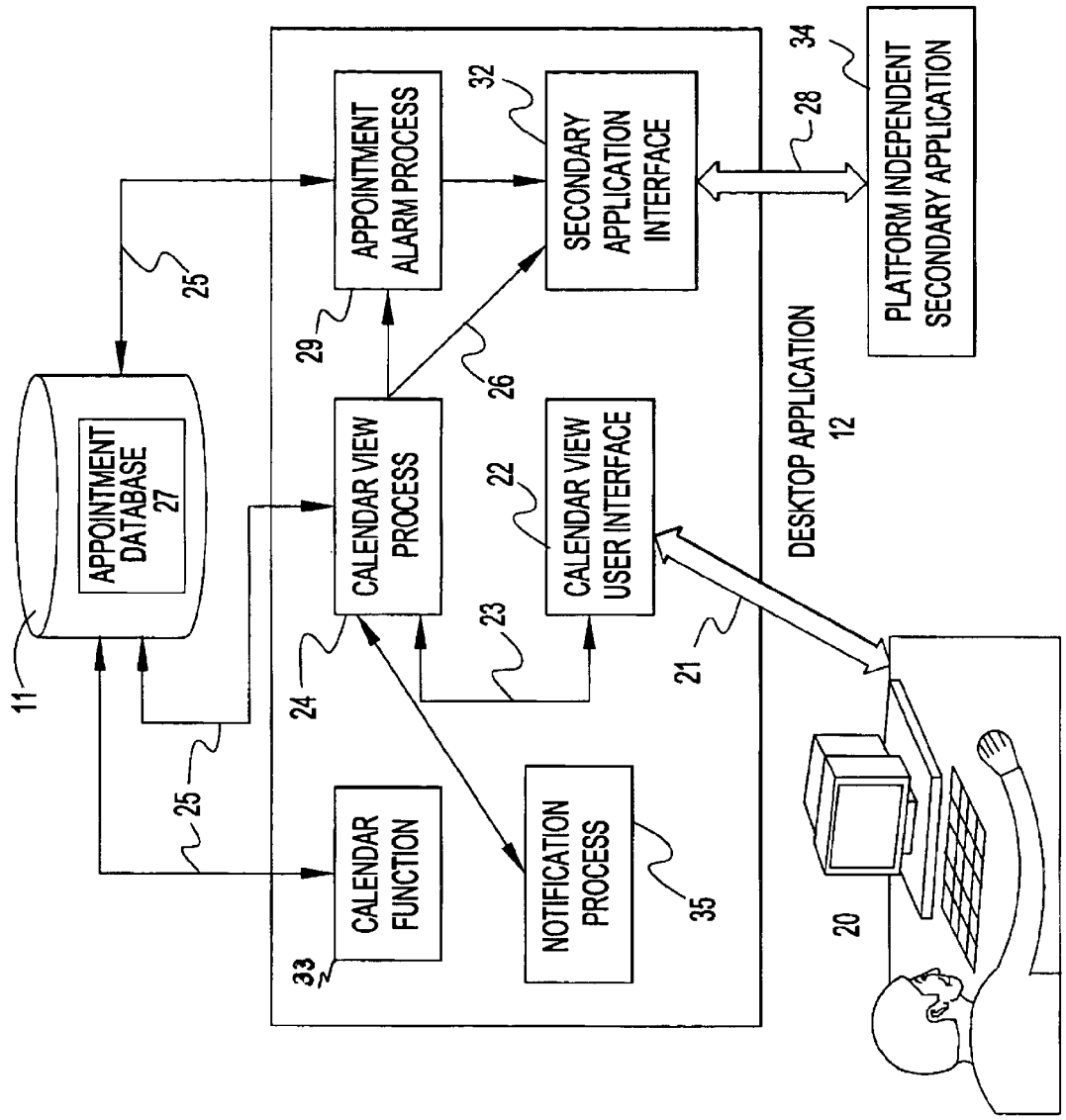
Figure 3:
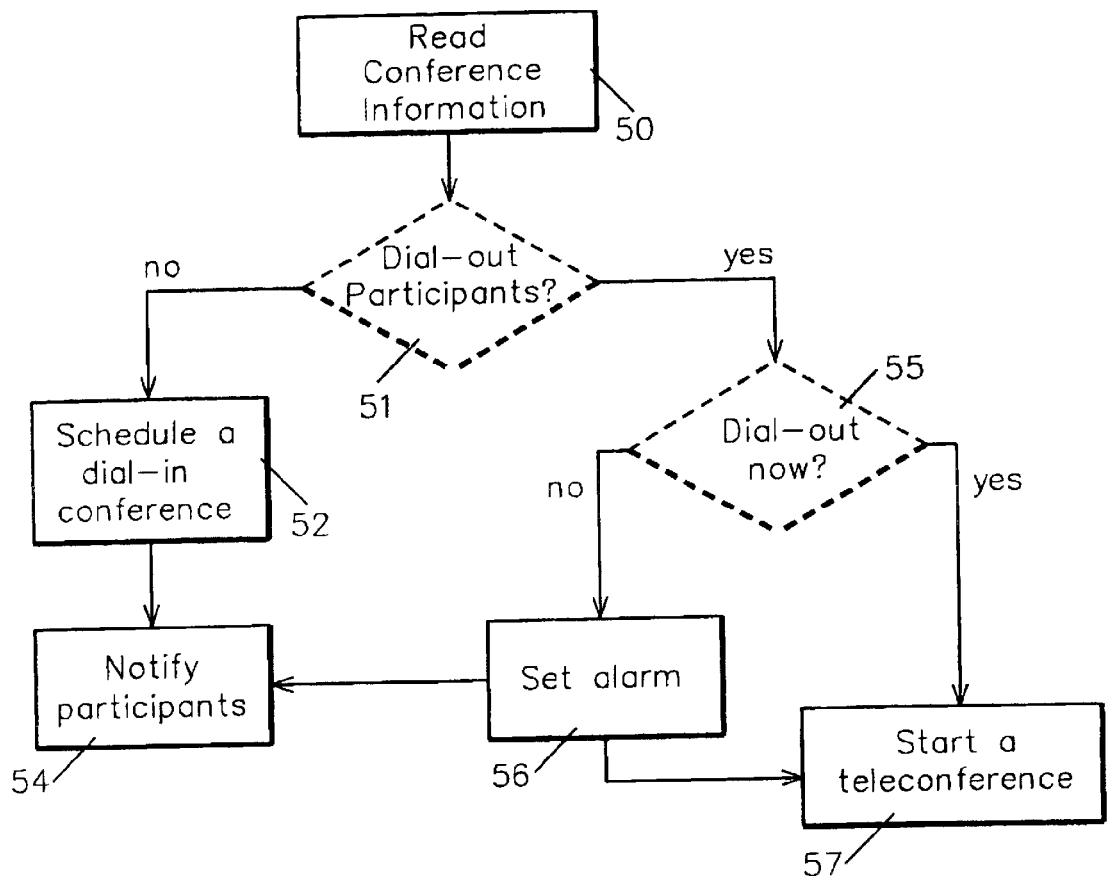
Figure 4:
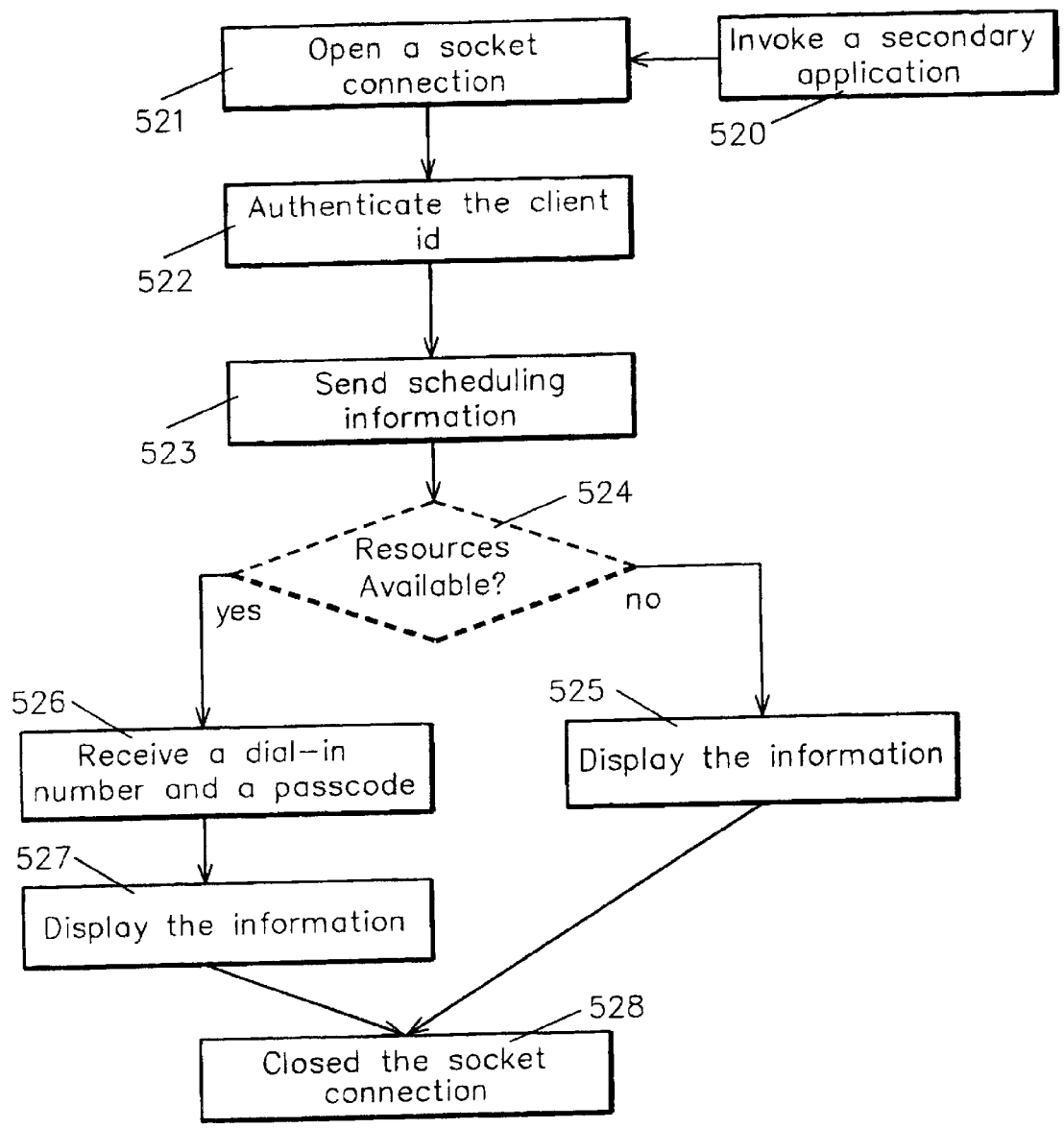
Figure 5:
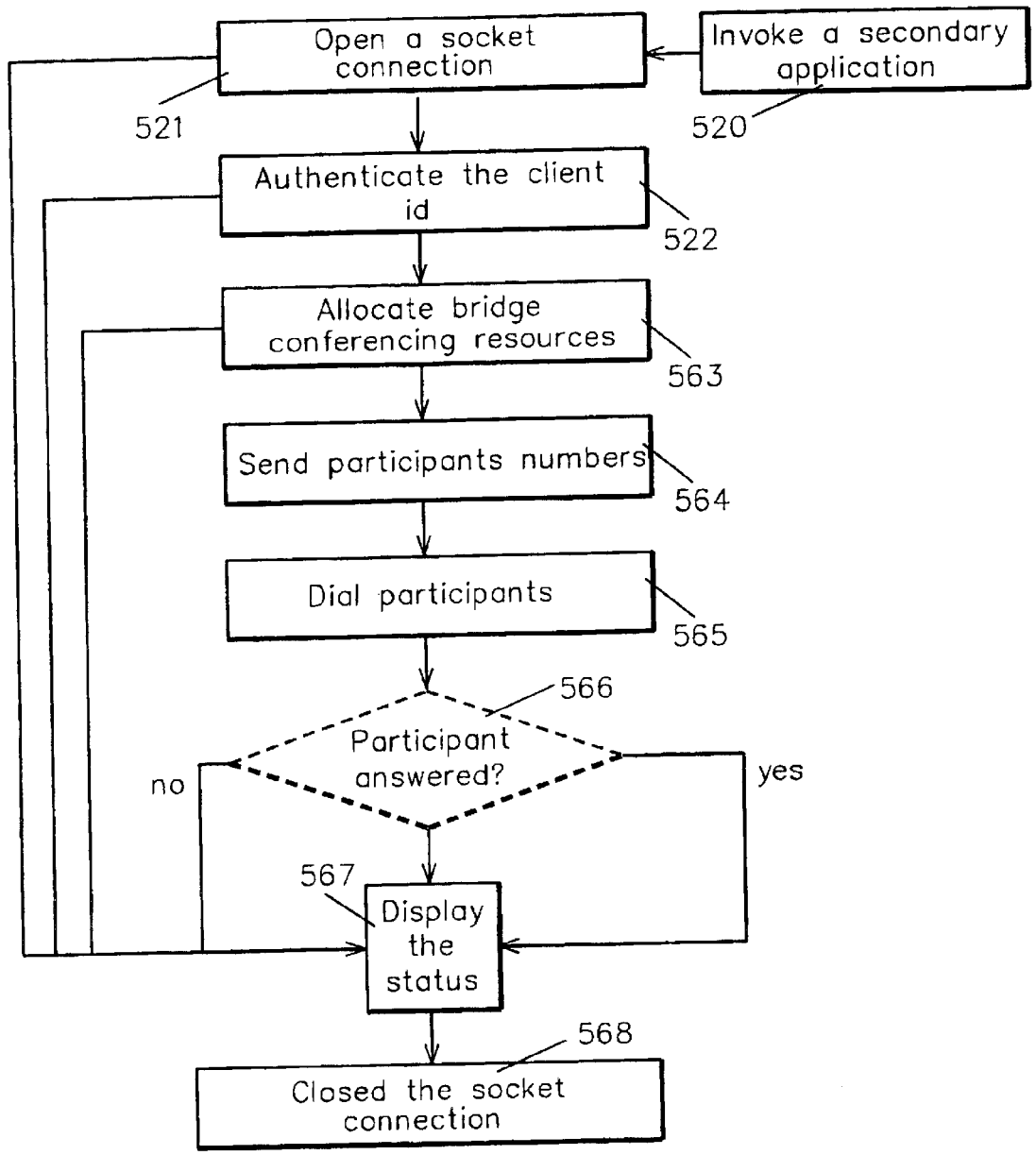
Figure 6:
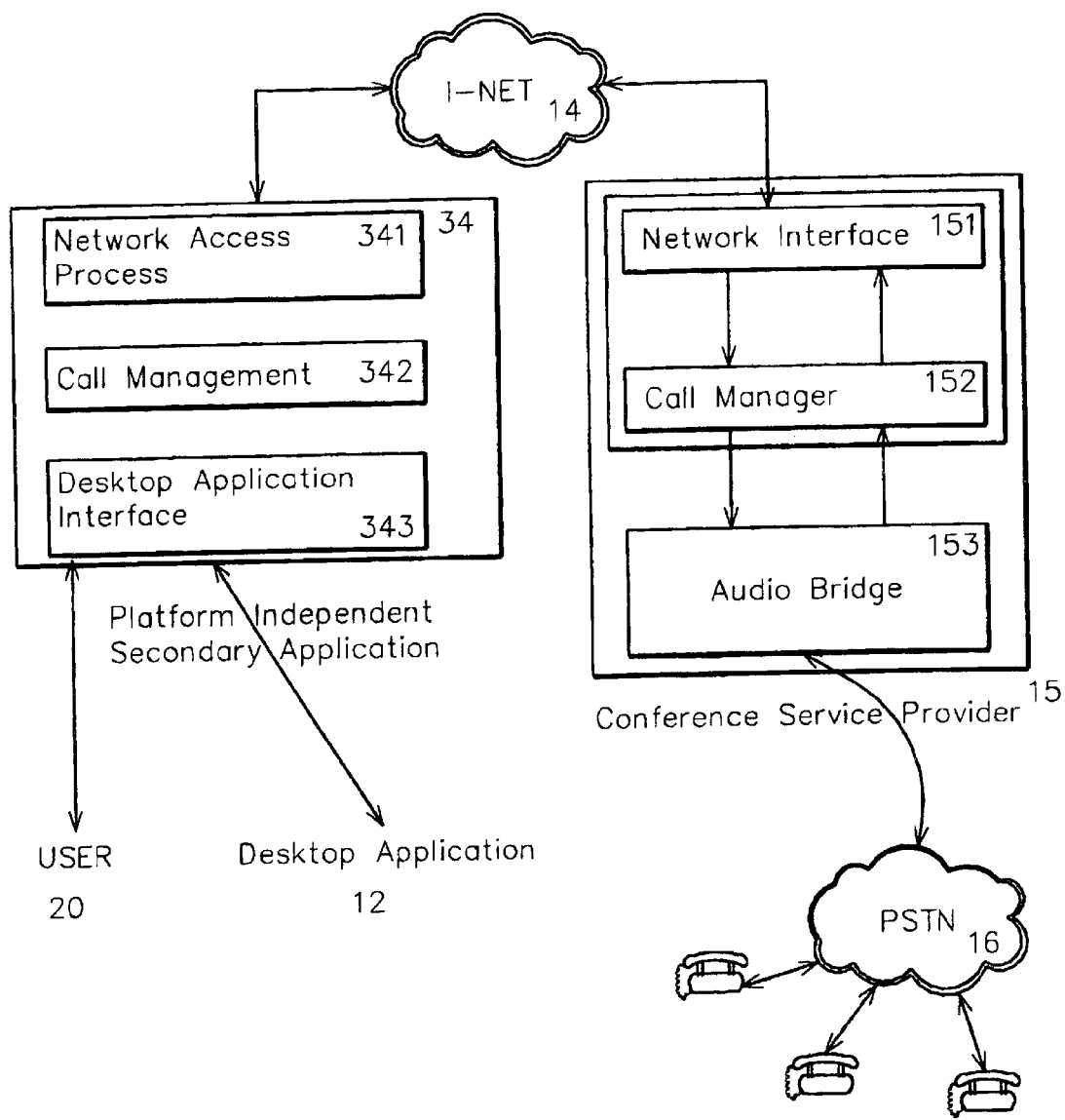

The invention will now be described in greater detail with specific reference to the appended drawings wherein:

FIG. 1 provides an illustration of a representative network having the components for automatically establishing a teleconference over the Internet in accordance with the present invention;

FIG. 2 shows the components of the desktop applications for use with the present invention;

FIG. 3 provides a flowchart for the inventive Calendar View Process;

FIG. 4 provides a flowchart for scheduling a dial-in conference in accordance with the present invention;

FIG. 5 provides a flowchart for starting a dial-out conference in accordance with the present invention; and FIG. 6 illustrates a connection between the Conference Service Provider and the Platform Independent Secondary Application.

DETAILED DESCRIPTION OF THE PREFERRED EMBODIMENT

FIG. 1 shows the components of the inventive system which establishes conferences automatically over the Internet under the present invention. The components are the Appointment Database 27 at storage location 11, the Desktop Application 12, a Platform Independent Secondary Application 13, a Data Network (Internet) 14, and the Conference Service Provider 15. The user 20 may interact with the Desktop Application and with the Platform Independent Secondary Application via interfaces 21 and 50, respectively, to set up and monitor or control the teleconference. The Desktop Application 12 is adapted to exchange communications, 25 discussed later, with Appointment Database 27, representatively shown at storage location 11, as well as to exchange communications, 21 and 28, with the user and the Secondary Application 13, respectively. Once the Secondary Application has been invoked, it automatically contacts the appropriate Conference Service Provider 15. The user may specify the Service Provider or select one from a menu. Alternatively, the Secondary Application may include an algorithm for selecting among a plurality of available service providers. The algorithm may be tailored to have the Secondary Application select the Service Provider which is in a stored listing, the least expensive, the geographically closest to the participants for reduced telephone charges, etc. The conference Service Provider 15 receives the service requests 17 over the Internet 14, allocates an audio bridge for the conference, and either dials out to the participants' phones via the Public Switch Telephony Network 16 or awaits dial-in calls for connecting to the audio bridge.

FIG. 2 shows the components of one embodiment of the desktop application 12 for automatically establishing conferences over the Internet in accordance with the present invention. Prior art office desktop applications are already enabled to execute calendar functions to schedule meetings and notify participants by utilizing a personal address book, shown generically at box 33 in FIG. 2. Examples of widely-used office desktop applications having calendaring and database functions include Lotus SmartSuite and Microsoft Office. Augmenting that functionality, the inventive desktop application 12 includes a Calendar View Process 24, a Calendar View User Interface 22, a Notification Process 35, an Appointment Alarm Process 29 and a Secondary Application Interface 32. While the inventive method is ideally invoked by user input to a desktop application, it is possible that the user may directly invoke the Secondary Application, as further detailed below.

In operation, a user 20 of the FIG. 2 system enters the conference information 21 from Calendar View User Interface 22. The conference information 21 may include the start date and time, the duration, the number of participants, the names and numbers of the participants, and the identity of a service provider along with the user's client id for billing purposes, if applicable. As noted above, the Secondary Application may be adapted to select a service provider. Further, the desktop application may not require user input of the participant's phone numbers, since the desktop application may already be adapted to automatically access that information from the Appointment Database 27, shown at storage location 11 of FIG. 2. The Calendar View User Interface 22 may include an input form provided to make it easier for the user to enter the conference reservation information. The same interface could also allow the user to readily modify or cancel their reservations. The information that is entered into the system by using the Calendar View User Interface 22 is then read via 23 by Calendar View Process 24 and processed.

The steps that are executed by the Calendar View Process 24 to schedule or start a teleconference are summarized in FIG. 3. Two types of conferences can be scheduled, a dial-in conference or a dial-out conference. For a dial-in conference, a user requests assignment of a dial-in number and a passcode so that the participants may dial in to the conference when the time comes. On the other hand, the moderator may request establishment of a dial-out conference in which the participants are contacted, or "dialed-out", automatically at the time of the conference. The conference information is read first, at step 50. The process determines if the request is for a dial-in or a dial-out conference, at step 51. If the reservation is for a dial-in conference, as determined at 51, a connection is established by the Secondary Application with the service provider to schedule the conference at step 52 (the details of which are discussed with reference to FIG. 4 below) and the participants are notified at step 54. If the request is for a dial-out conference, the process determines at step 55 whether the dial-out conference is to begin immediately or is to be conducted at a later time. If the conference is to be conducted immediately, the Secondary Application starts the teleconference at step 57 (the details of which are further provided with reference to FIG. 5). In the alternative, for a dial-out conference which is to be conducted later, an alarm is set at step 56 for the future conference and the participants are notified at step 54. It is to be noted that the alarm function can be implemented in a variety of ways. The Appointment Alarm Process 29 can set a timer based on teleconference information which is provided to it directly, or can monitor the Appointment Database 27, as mentioned above. Since many desktop applications may already have the latter functionality, whereby an alarm process monitors an appointments database, it may be preferable to implement the invention with that existing functionality, rather than modify the existing alarm code.

Referring back to FIG. 2, if the conference information that is entered is for the scheduling of a dial-in conference, the Calendar View Process 24 writes the reservation request into the Appointment Database 27, shown at storage location 11, and sends a reservation request 26 to the Secondary Application 34, via the Secondary Application Interface 32, to be sent to the Conference Service Provider 15. Similarly, if the user enters conference information to delete or modify an existing reservation, the Calendar View Process 24 writes the modification to the Appointments Database 27 and sends a modification request 26 to the Conference Service Provider 15 via Secondary Application 34. Since a dial-in conference requires confirmation with the dial-in number and, usually, with a password as well, the Conference Service Provider 15 must generate and transmit a confirmation or rejection of each request to the Calendar View Process 24. Hence, the users are informed immediately regarding the requests that they have sent. Once the reservation or modification request is confirmed, the conference call participants are notified through the Notification Process 35 of the desktop application. The desktop application automatically contacts participants through e-mail messages informing them of the time, date, dial-in number, etc., to which the participants must respond with an e-mail either accepting or rejecting the conference. Generally such notifications by e-mail are fed directly into the recipient's calendar once the e-mail has been-opened and must be deleted by the recipient if the conference time is being rejected. When a user learns of participant rejection, the user may start the process over again or opt to conduct the conference without the unavailable participant. The desktop application additionally informs the Appointment Alarm Process 29 of the scheduled conference so that it may signal the user to dial in, or alternatively signal the Secondary Application 34 to dial in on behalf of the user, at the appropriate time. The process for automatically scheduling a dial-in conference call will now be further detailed with reference to FIG. 4.

In response to a determination that the user wishes to schedule a dial-in conference, the Calendar View Process 24 invokes the Platform Independent Secondary Application 34 through an Application Interface shown as 32. Byway of example, in Lotus Notes, the secondary application interface is defined as a script programming interface. The Secondary Application in accordance with the present invention is preferably developed in JAVA for platform independence. As shown in the flowchart in FIG. 4, once the Platform Independent Secondary Application 34 is invoked at 520, it opens a socket connection at step 521 with the teleconference service provider and sends a client identification signal. The service provider authenticates the client id at step 522 and the conference scheduling information is communicated at step 523. If the resources are not available, as determined at step 524, the user is notified at step 525, followed by the socket connection being closed at step 528. If, however, it is determined at step 524 that the resources are available to schedule a new conference, a dial-in number and passcode are returned at step 526, followed by display of the returned information at the requester's monitor in step 527. Once the process of scheduling a dial-in conference is completed, the secondary application closes the socket connection with the service provider at step 528. As discussed above, the desktop application, independent of the Secondary Application, generates e-mails to notify the participants of the scheduled conference, phone number etc. and sets the alarm.

If, on other hand, the request is for a dial-out conference, the user inputs the identities of the participants, and/or their telephone numbers along with the other conference information via the Calendar View User Interface 22. If not directly provided by the user, the telephone numbers of the participants can be read automatically from a Personal Address file. While the Secondary Application can be provided with the functionality to browse for a site to locate the participants' phone numbers from a publicly available "Yellow Pages" file, such is not entirely practical from the standpoints of both time and resource utilization. Rather, if the Secondary Application has not been provided with the phone number from the local address file, it prompts the user to supply the needed information. If the request is for an immediate dial-out conference, then the Platform Independent Secondary Application 34 is invoked through the Secondary Application Interface 32 to start the teleconference. If the application is for the future, however, then the Calendar View Process 24 writes the request to the Appointment Database 27 and sets an alarm through the Appointment Alarm Process 29. The Appointment Alarm Process 29 periodically checks the Appointment Database 27 for scheduled conferences. Hence, the main function of the Appointment Alarm Process 29 in a dial-out conference is to read the start date/time of the appointment entries and to invoke the Secondary Application 34 via Secondary Application Interface 32 to start the conference automatically when the time for the conference comes.

The flowchart in FIG. 5 describes how the platform independent Secondary Application is used to start a dial-out teleconference. Once the Calendar View Process determines that it is time for a dial-out conference, either in response to the determination made at step 55 of FIG. 3, or upon being notified by the Appointment Alarm Process, the Calendar View Process invokes the Platform Independent Secondary Application at step 520, which in turn opens a socket connection at step 522. The client id is authenticated at step 523 and a request is sent to the Conference Service Provider 15, at step 563, to allocate audio bridge conference resources immediately. Once the request is accepted, the Platform Independent Secondary Application 34 sends the telephone numbers of the participants to be dialed at step 564. Upon receipt of the numbers, the audio bridge 153 starts dialing the participants' numbers, in step 565, via PSTN 16 as shown in FIG. 1. As the participants answer the phone, the service provider call manager 152 adds them to the conference bridge and report the status in step 567 to the Platform Independent Secondary Application 34. Should a participant not answer the phone, as determined in step 566, that status is also reported for display to the user. Once all available participants have joined, the Secondary Application can close the socket connection at step 568. Alternatively, the Secondary Application can keep the socket connection open and continue to monitor the status of the conference and report same to the user. Hence, the main function of the platform independent Secondary Application 34 is to communicate with the Conference Service Provider 15 over a Data Network 14, preferably Internet. Since this secondary application is platform independent, it runs in any platform including the platform of the first application. The Secondary Application additionally communicates with its "local" entities, either the desktop application, the user, or both. For dial-in conferences, the Secondary Application communicates with the desktop application, with the desktop informing the user as appropriate. For a dial-out conference, however, the Secondary Application will communicate directly to the user, without going through the desktop application, for monitoring and controlling the conference. Additionally, the user may opt to invoke the Secondary Application directly if the user is not concerned with any of the desktop application feature, such as the calendaring, notification and alarm functions.

FIG. 6 shows the connection between the Platform Independent Secondary Application 34 and the Conference Service Provider 15 over the Internet, the components of the Platform Independent Secondary Application 34 and the components of the Conference Service Provider 15. When the Desktop Application 12 invokes the Platform Independent Secondary Application 34, the telephone numbers of the participants 21 that are provided by the user 20 are passed to the Platform Independent Secondary Application 34 from the Desktop Application Interface 343 while the Call Management Process 342 of the Secondary Application tries to establish a connection with the Conference Service Provider 15 over the Internet 14 by invoking the Network Access Process 341. The Conference Service Provider 15 receives the communication request over the Internet via a Network Interface 151, which is provided with a translator for translating requests from the Secondary Application for use by the Call Manager. The Call Manager 152 is a software program which includes processes for translating call requests from the Platform Independent Secondary Application 34 into Audio Bridge 153 control commands and sends them to the audio bridge 153. The Call Manager 152 forwards call requests to the call manager including, but not limited to: a request to start/end a conference; a request to dial/hangup participants; add/drop participants to/from the conference; get conference status; and, get party status. The Call Management Process 342 receives the status information from the Conference Service Provider's Call Manager 152 regarding the audio bridge. This information includes the status of each participants if they are connected, hung-up, being dialed or busy. The status of the conference, if it is active or completed, is also sent to the Call Management Process 342. The conference and participants' status information are displayed to the user via Desktop Application Interface 343. Hence, the user is aware of the status of each participant and the status of the conference via user connection to the Secondary Application 50.

The invention has been described with reference to several preferred implementations. It will be apparent to one having skill in the art that modifications can be made without departing from the spirit and scope of the invention, as set forth in the appended claims.

What is claimed is:

1. A method of automatically establishing a conference over the Internet from a desktop calendar application at a user computer, said method comprising the steps of:

receiving user input of conference information at a user's appointment calendar page generated by the desktop calendar application;

said desktop calendar application automatically invoking a platform independent secondary conference application and providing the secondary conference application with the conference information;

automatically dialing a conference service provider from the secondary conference application;

communicating a conference request to the conference service provider from the secondary conference application;

receiving conference confirmation information from the service provider; and providing notification from said secondary application to the desktop calendar application of receipt of the conference confirmation information.

2. The method of claim 1, wherein the user computer maintains a user appointment calendar, further comprising the desktop application updating the appointment calendar with the conference confirmation information.

3. The method of claim 1, wherein the user computer has an alarm function, further comprising the desktop application invoking the alarm function based on the conference confirmation information.

4. The method of claim 3, wherein invoking the alarm function comprises setting the alarm to a preset time and further comprising the secondary application automatically dialing in to the service provider at the preset time.

5. The method of claim 1 further comprising the desktop calendar application generating e-mail notifications to conference participants based on the conference confirmation information.

6. A method of automatically establishing a conference over the Internet from a desktop calendar application at a user computer, said method comprising the steps of:

receiving user input of conference information at a user's appointment calendar page generated by the desktop calendar application;

said desktop calendar application automatically invoking a platform independent secondary conference application and providing the secondary application with the conference information;

automatically dialing a conference service provider from the secondary application;

communicating a conference request to the conference service provider from the secondary application; and receiving conference confirmation information from the service provider;

wherein the conference request includes a request for an immediate conference and further comprising said service provider establishing the conference across an audio bridge and wherein receiving conference confirmation information comprises being connected to the audio bridge.

7. The method of claim 6 further comprising the secondary application monitoring the status of the conference and reporting the status to the user computer.

8. Apparatus for automatically establishing a conference over the Internet from a user computer comprising:

a desktop calendar application;

at least one user input interface for receiving user input of conference information at a user's appointment calendar page generated by said desktop calendar application;

an application interface for said desktop calendar application to automatically invoke a platform independent secondary conference application and providing the secondary application with the conference information;

a secondary conference application for receiving conference information, for automatically dialing a conference service provider, for communicating a conference request to the conference service provider, for receiving conference confirmation information from the conference service provider, and for providing notification of receipt of the conference confirmation information; and wherein said desktop calendar application is adapted for receiving the user input from the user input interface, for processing the conference information, and for receiving notification of receipt of the conference confirmation information from the secondary application.

9. The apparatus of claim 8 wherein the desktop calendar application additionally comprises the application interface to the secondary application.

10. The apparatus of claim 8 wherein the desktop calendar application additionally comprises a calendar component for updating a user appointment calendar based on conference confirmation information.

11. The apparatus of claim 8 wherein the desktop calendar application additionally comprises an alarm component for the desktop calendar application to invoke an alarm function based on the conference confirmation information.

12. The apparatus of claim 11, wherein the alarm component includes a clock and wherein invoking the alarm function comprises setting the clock to a preset time based on the conference confirmation information.

13. The apparatus of claim 8 wherein the desktop calendar application additionally comprises a notification component for generating e-mail notifications based on the conference confirmation information.

14. A desktop calendar application for a user computer to automatically establish a conference from said desktop application over the Internet comprising:
   at least one user input interface for receiving user input of conference information to a user appointment calendar page generated by said desktop calendar application;
   an application interface for automatically invoking a platform independent secondary conference application and providing the secondary application with the conference information and for receiving conference confirmation information from the secondary application; and
   a calendar update component for updating the user appointment calendar based on conference confirmation information.

15. The desktop application of claim 14 additionally comprising a notification component for generating e-mail notifications based on the conference confirmation information.

16. A desktop calendar application for a user computer to automatically establish a conference from said desktop application over the Internet comprising:
   at least one user input interface for receiving user input of conference information to a user appointment calendar page generated by said desktop application;
   an application interface for automatically invoking a platform independent secondary conference application and providing the secondary application with the conference information and for receiving conference confirmation information from the secondary application; and
   an alarm component for the desktop application to invoke an alarm function based on the conference confirmation information.

17. The desktop application of claim 16, wherein the alarm component includes a clock and wherein invoking the alarm function comprises setting the clock to a preset time based on the conference confirmation information.

18. A platform independent secondary conference application at a user computer for automatically establishing a conference from the user computer over the Internet comprising:
   an interface component for receiving user input conference information to a user appointment calendar page generated by a desktop calendar application;
   a dialer component for automatically dialing over the Internet to a conference service provider and for communicating conference information to the conference service provider;
   a receiver for receiving conference confirmation information from the conference service provider; and
   a conference monitoring component for monitoring a conference established based on the conference confirmation information.

19. The secondary application of claim 18 wherein the conference monitoring component additionally comprises means for communicating conference change information over the Internet to the service provider.

20. The secondary application of claim 18 further comprising user interface component for communicating conference monitoring information to the user.

21. A method of automatically establishing a conference over the Internet from a user computer, said method comprising the steps of:
   receiving user input of conference information at a platform independent secondary conference application from a user appointment calendar page generated by a desktop calendar application;
   automatically dialing a conference service provider from the secondary application;
   communicating a conference request to the conference service provider from the secondary application;
   receiving conference confirmation information from the conference service provider; and
   providing notification from said secondary application of receipt of the conference confirmation information.

22. A method of automatically establishing a conference over the Internet from a user computer, wherein the user computer maintains a user appointment calendar, said method comprising the steps of:
   receiving user input of conference information at a platform independent secondary conference application from a user appointment calendar page generated by a desktop calendar application;
   automatically dialing a conference service provider from the secondary application;
   communicating a conference request to the conference service provider from the secondary application;
   receiving conference confirmation information from the conference service provider; and
   updating the appointment calendar with the conference confirmation information.

23. A method of automatically establishing a conference over the Internet from a user computer, wherein the user computer has an alarm function, said method comprising the steps of:
   receiving user input of conference information at a platform independent secondary conference application from a user appointment calendar page of a desktop calendar application;
   automatically dialing a conference service provider from the secondary application;
   communicating a conference request to the conference service provider from the secondary application;
   receiving conference confirmation information from the conference service provider; and
   invoking the alarm function based on the conference confirmation information and automatically dialing in from the secondary conference application to the conference service provider at the preset time.

24. A method of automatically establishing a conference over the Internet from a user computer, said method comprising the steps of:

receiving user input of conference information at a platform independent secondary conference application from a user appointment calendar page of a desktop calendar application;

automatically dialing a conference service provider from the secondary application;

communicating a conference request to the conference service provider from the secondary application; and receiving conference confirmation information from the conference service provider;

wherein the conference request includes a request for an immediate conference and further comprising said conference service provider establishing the conference across an audio bridge and wherein receiving conference confirmation information comprises being connected to the audio bridge.

25. A program storage device readable by machine, tangibly embodying a program of instructions executable by the machine to perform method steps for automatically establishing a conference from a desktop calendar application at a user computer over the Internet, said method steps comprising:

receiving user input of conference information at a user appointment calendar page generated by the desktop calendar application;

automatically invoking a platform independent secondary conference application and providing the secondary application with the conference information;

automatically dialing a conference service provider from the secondary application;

communicating a conference request to the conference service provider from the secondary application;

receiving conference confirmation information from the conference service provider; and providing notification from said secondary application to the desktop application of receipt of the conference confirmation information.

26. A program storage device readable by machine, tangibly embodying a program of instructions executable by the machine to perform method steps for automatically establishing a conference from a user computer over the Internet, said method steps comprising:

receiving user input of conference information at a platform independent secondary conference application from a user appointment calendar page of a user desktop calendar application;

automatically dialing a conference service provider from the secondary application;

communicating a conference request to the conference service provider from the secondary application;

receiving conference confirmation information from the conference service provider; and providing notification from said secondary application of receipt of the conference confirmation information.

* * * * *